(12) United States Patent
Kendrick et al.

(10) Patent No.: US 7,391,519 B1
(45) Date of Patent: Jun. 24, 2008

(54) GENERATION OF SPATIALLY DISTRIBUTED SPECTRAL DATA USING A MULTI-APERTURE SYSTEM

(75) Inventors: Richard L. Kendrick, San Mateo, CA (US); Eric H. Smith, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 190 days.

(21) Appl. No.: 11/451,310

(22) Filed: Jun. 13, 2006

Related U.S. Application Data (60) Provisional application No. 60/690,495, filed on Jun. 15, 2005.

(51) Int. Cl.
*G01B 9/02* (2006.01)
(52) U.S. Cl. ........................ 356/456; 356/451
(58) Field of Classification Search ................ 356/451, 356/456
See application file for complete search history.

(56) References Cited

U.S. PATENT DOCUMENTS

| | | | | |
|---|---|---|---|---|
| 4,136,954 A | * | 1/1979 | Jamieson | 356/456 |
| 4,856,884 A | * | 8/1989 | Fender et al. | 359/419 |
| 5,905,591 A | * | 5/1999 | Duncan et al. | 359/399 |
| 7,034,945 B2 | * | 4/2006 | Kendrick et al. | 356/456 |
| 7,092,103 B1 | * | 8/2006 | Kendrick et al. | 356/497 |
| 7,154,608 B1 | * | 12/2006 | Glassman | 356/450 |

* cited by examiner

*Primary Examiner*—Patrick Connolly
*Assistant Examiner*—Jonathan Skovholt
(74) *Attorney, Agent, or Firm*—McDermott Will & Emery LLP (57) ABSTRACT

Detecting the presence of a target material in a scene by using a multi-aperture interferometer system having a plurality of apertures at least one of which has an adjustable optical path length, by adjusting the aperture(s) to obtain a predetermined optical path length difference among the apertures, the predetermined optical path length difference being based on a source laser wavelength and a target material wavelength, illuminating the scene with the source laser, capturing a spectral data set corresponding to an interference pattern generated in the multi-aperture interferometer system for an illuminated point source in the scene, the spectral data set containing spatially distributed spectral data, and determining whether the target material is present at the illuminated point source based on a presence of spectral data in at least one side lobe of the spectral data set.

24 Claims, 9 Drawing Sheets

GENERATION OF SPATIALLY DISTRIBUTED SPECTRAL DATA USING A MULTI-APERTURE SYSTEM

CROSS-REFERENCE TO RELATED APPLICATION

The present application claims the benefit of priority under 35 U.S.C. §119 from U.S. Provisional Patent Application Ser. No. 60/690,495 entitled "SPATIALLY DISTRIBUTED SPECTRAL DATA USING A FIZEAU INTERFEROMETER," filed on Jun. 15, 2005, the disclosure of which is incorporated herein by reference in its entirety for all purposes.

STATEMENT REGARDING FEDERALLY SPONSORED RESEARCH OR DEVELOPMENT

Not Applicable.

FIELD OF THE INVENTION

The present invention concerns spectroscopy, and in particular concerns the use of a multi-aperture optical system acting as a Fizeau interferometer to generate spatially distributed spectral data.

BACKGROUND OF THE INVENTION

Laser induced fluorescence is an established technique for classifying and identifying materials that absorb a particular wavenumber or waveband of radiation. The majority of applications of laser induced fluorescence involve using a pump laser that is matched to an absorption band of the material of interest. The material then fluoresces at a certain wavelength or over a waveband. A spectrometer is used to obtain a spectral fingerprint of the radiation from fluorescence and a grating device or prism is used in the spectrometer to disperse the various wavelengths so that they are spread across a focal plane. However, traditional imaging spectrometers typically require long integration times.

Fizeau interferometers, such as in the form of a multi-aperture telescopes, can also be used in a Fourier Transform Spectroscopic (FTS) mode to acquire high resolution spectral data. However, the Fizeau FTS mode typically requires the collection hundreds of images to in order to obtain the necessary spectral data. The time required to obtain these sets of data can be prohibitive for many applications, especially where it is desirable to quickly identify whether a particular material associated with a particular wavenumber or waveband of radiation is present in a scene.

In view of the above, it is desirable to have a system for quickly and efficiently capturing desired spectral data from a point source and determining the presence of a particular material in the point source that is associated with a particular wavenumber or waveband of radiation.

SUMMARY OF THE INVENTION

The present invention solves the foregoing problems by providing a method and system that uses a multi-aperture optical system acting as a Fizeau interferometer to generate spatially distributed spectral data quickly and efficiently. In this manner, the multi-aperture optical system captures a single image of desired spectral data from a point source in a scene and generates spatially distributed spectral data. The presence of a particular target material associated with a particular wavenumber or waveband is then quickly determined according to the presence of spectral data in the side lobes of the spatially distributed spectral data.

In one embodiment, the invention is directed to a method for detecting the presence of a target material in a scene by using a multi-aperture interferometer system having a plurality of apertures at least one of which has an adjustable optical path length. The method includes the steps of adjusting the at least one aperture having the adjustable optical path length to obtain a predetermined optical path length difference among the plurality of apertures, the predetermined optical path length difference being based on a source laser wavelength of a source laser and a target material wavelength of a target material, illuminating the scene with the source laser, capturing a spectral data set corresponding to an interference pattern generated in the multi-aperture interferometer system for an illuminated point source in the scene, the spectral data set containing spatially distributed spectral data, and determining whether the target material is present at the illuminated point source based on a presence of spectral data in at least one side lobe of the spectral data set.

In another embodiment, the invention is directed to computer-executable process steps for detecting the presence of a target material in a scene by using a multi-aperture interferometer system having a plurality of apertures at least one of which has an adjustable optical path length, the computer-executable process steps including adjusting the at least one aperture having the adjustable optical path length to obtain a predetermined optical path length difference among the plurality of apertures, the predetermined optical path length difference being based on a source laser wavelength of a source laser and a target material wavelength of a target material, illuminating the scene with the source laser, capturing a spectral data set corresponding to an interference pattern generated in the multi-aperture interferometer system for an illuminated point source in the scene, the spectral data set containing spatially distributed spectral data, and determining whether the target material is present at the illuminated point source based on a presence of spectral data in at least one side lobe of the spectral data set.

In a further embodiment, the invention concerns a multi-aperture imaging system for detecting the presence of a target material in a scene, the system including a plurality of apertures at least one of which has an adjustable optical path length, each aperture collecting a wavefront portion, combiner optics for combining and interfering on an image plane the collected wavefront portions to create a spatially-distributed interference pattern which is captured by at least one digital radiation intensity sensor to generate a spatially-distributed spectral data set, one or more processors, and a computer readable medium carrying one or more sequences of instructions for detecting the presence of a target material in a scene, wherein execution of the one or more sequences of instructions by the one or more processors causes the one or more processors to perform the steps of adjusting the at least one aperture having the adjustable optical path length to obtain a predetermined optical path length difference among the plurality of apertures, the predetermined optical path length difference being based on a source laser wavelength of a source laser and a target material wavelength of a target material, illuminating the scene with the source laser, capturing a spectral data set corresponding to an interference pattern generated in the multi-aperture interferometer system for an illuminated point source in the scene, the spectral data set containing spatially distributed spectral data, and determining whether the target material is present at the illuminated point source based on a presence of spectral data in at least one side lobe of the spectral data set.

In particular embodiments, the multi-aperture interferometer is a multi-telescope array of a plurality of telescope apertures which are divided into two groups, the first group being adjusted to a first optical path length and the second group being adjusted to a second optical path length in accordance with the predetermined optical path length difference. In this regard, the predetermined optical path length difference is determined so that spectral data corresponding to the source laser wavelength is in-phase, and so that spectral data corresponding to the target material wavelength is out-of-phase, thereby causing the spectral data of the target material wavelength to appear in the side lobes of the spatially-distributed spectral data. The appearance of the material wavelength data in the side lobes provides for a quick and efficient determination of whether the target material is present at the point source in the scene.

In this manner, the multi-aperture optical system of the invention quickly and efficiently captures a single image of desired spectral data from a point source in a scene and generates spatially distributed spectral data. The presence of a particular target material associated with a particular wavenumber or waveband is then quickly determined according to the presence of spectral data in the side lobes of the spatially distributed spectral data.

This brief summary has been provided so that the general nature of the invention may be understood quickly. A more complete understanding of the invention can be obtained by reference to the following detailed description thereof in connection with the attached drawings. It is to be understood that embodiments of the invention other than that provided in the description below and the accompanying drawings may be utilized and that changes may be made without departing from the scope of the present invention.

DETAILED DESCRIPTION OF THE INVENTION

As mentioned above, the present invention utilizes a multi-aperture optical imaging system by adjusting the optical path lengths of the apertures to known values according to a desired wavelength or waveband for collection, collecting an image of a scene, and extracting rudimentary spectral information from the one collected image regarding the desired wavelength or waveband.

Figure 1:
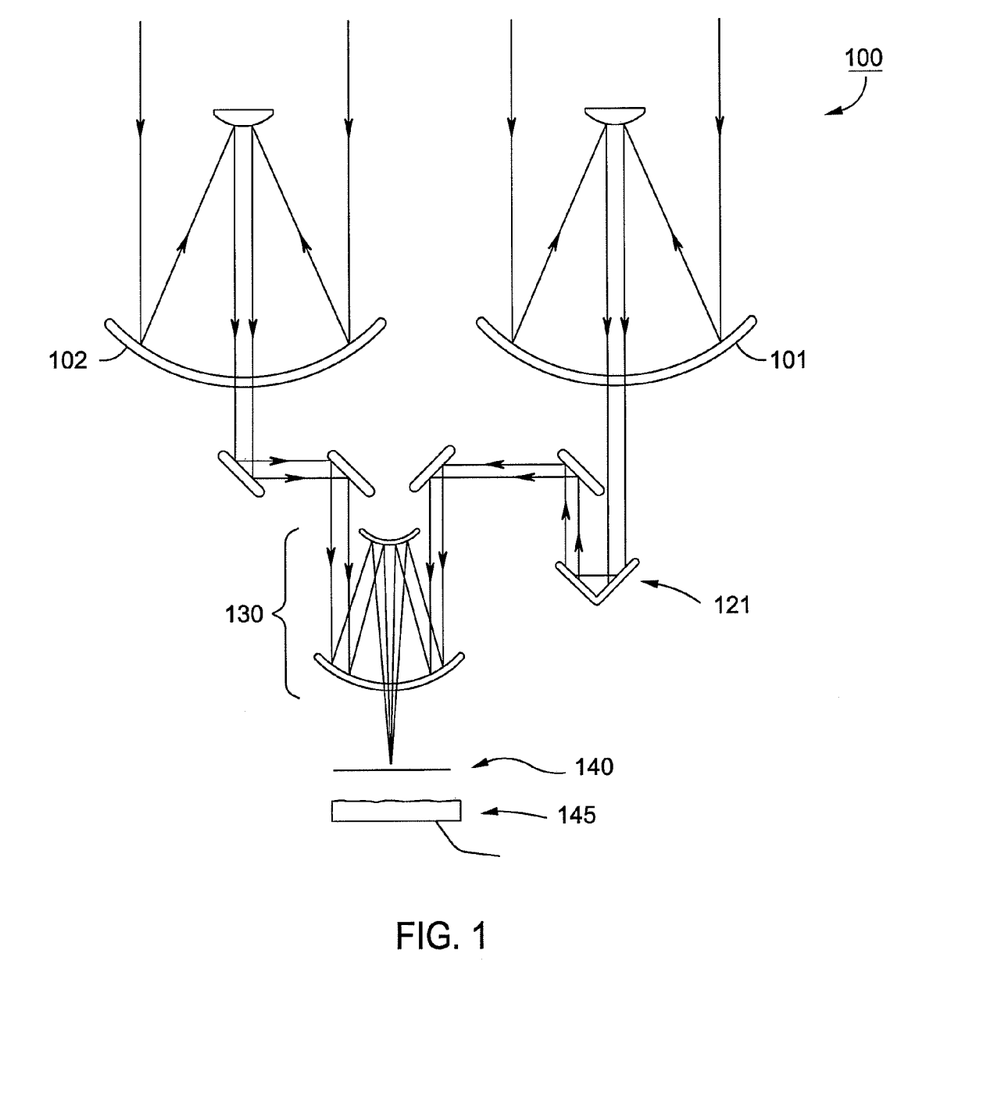
FIG. 1 is a diagram of a multi-aperture interferometer with which the invention may be practiced according to one embodiment of the invention.

FIG. 1 is a basic diagram for illustrating a basic multi-aperture interferometer system with which the present invention may be implemented. As seen in FIG. 1, interferometer system 100 is shown and includes apertures 101 and 102 for collecting wavefront 150 from a distant scene (not shown). The collected wavefront from each of apertures 101 and 102 is directed to combiner optics 130 through the use of mirrors. At least one of the apertures, in this case aperture 101, includes an independent path length adjustment device 121 for adjusting the optical path length of the incident radiation gathered by aperture 101 to image plane 140. In this manner, the optical path lengths (D1 and D2) of apertures 101 and 102 adjustable to different distances with respect to each other, which provides the capability to adjust optical path length difference of interferometer system 100 to a desired amount.

Combiner optics 130 of interferometer system 100 is a combination of lenses and mirrors, such as a combiner telescope, for combining the incident radiation collected by apertures 101 and 102 at image plane 140 to generate a combined image. In this regard, an image sensor 145 is provided at the image plane to digitally record (collect) the combined wavefronts formed from the radiation collected by apertures 101 and 102. Image sensor 145 is preferably comprised of at least one digital light intensity sensor that can record image intensity data over a range of wavelengths.

In one embodiment, interferometer system 100 is a multi-telescope array of telescope apertures which functions according to the same principles described above with respect to FIG. 1. Such a multi-telescope array optical system may be provided on a space-based platform for collecting images from space, such as of Earth. Some or all of the telescope apertures in the multi-telescope array have independently-adjustable optical lengths (to the image plane) in order to adjust the optical path length difference of interferometer system 100.

Figure 2:
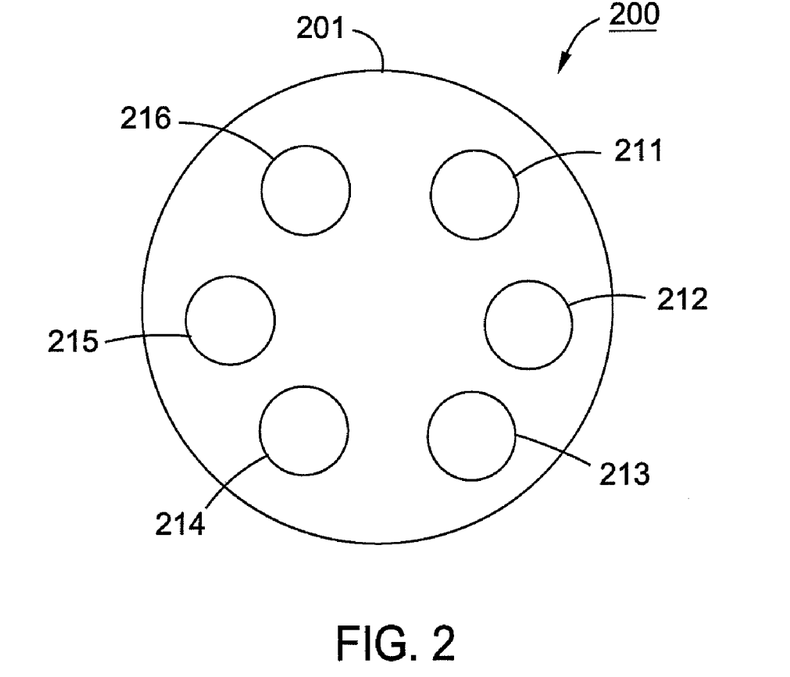
FIG. 2 is a diagram of a multi-telescope array interferometer according to another embodiment of the invention.

FIG. 2 shows a depiction of multi-telescope array interferometer system 200 according to an exemplary embodiment of the invention. As seen in FIG. 2, multi-telescope array interferometer system 200 is comprised of platform 201 which houses six telescope apertures 211 to 216. Each of telescope apertures 211 to 216 has an independently-adjustable optical length. In one embodiment, telescope apertures 211 to 216 are grouped into a first group, comprised of telescope apertures 211, 213 and 215, and a second group, comprised of telescope apertures 212, 214 and 216. The first group are set at a first optical path length, and the second group are set at a second optical path length different than the first optical path length, thereby achieving a desired optical path length difference of interferometer system 100.

Figure 3:
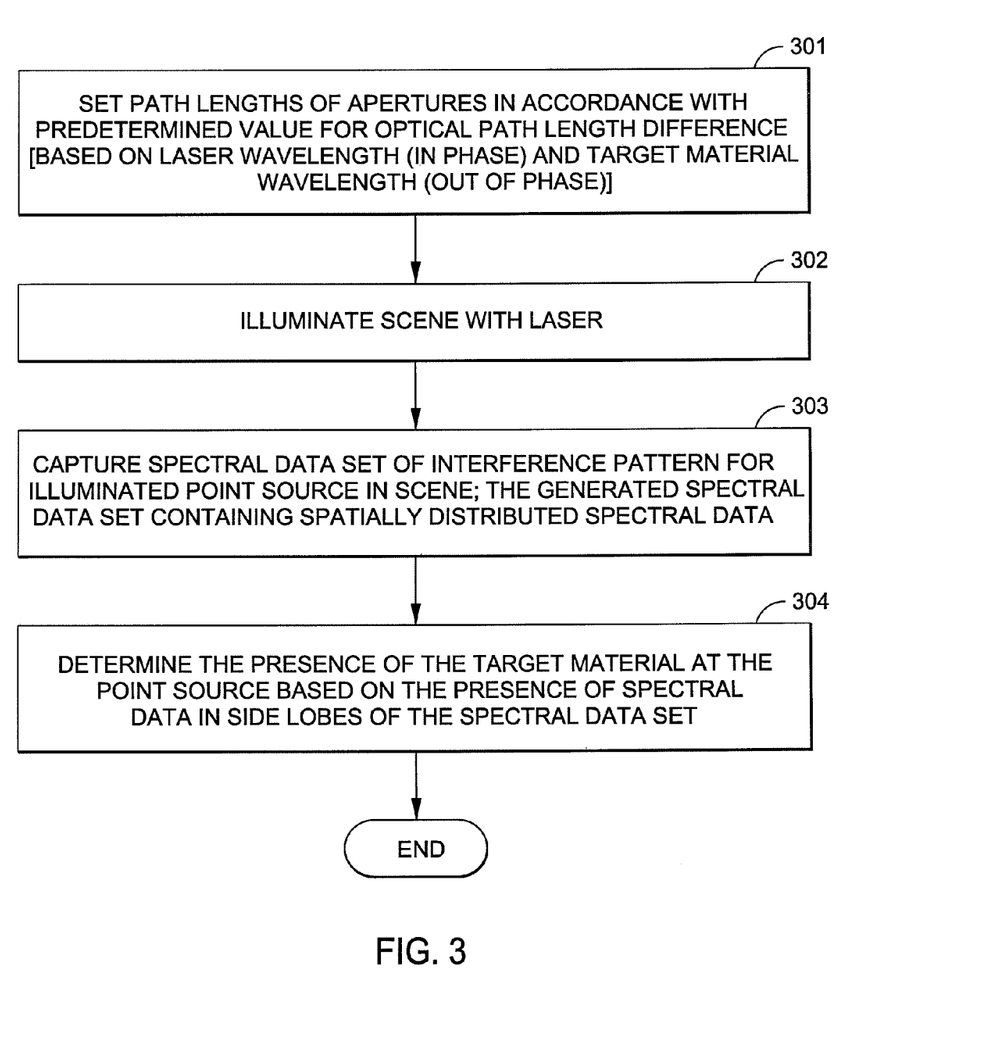
FIG. 3 is a flowchart for explaining the use of a multi-aperture interferometer to detect the presence of a target material according to one embodiment of the invention.

FIG. 3 is a is flowchart explaining the use of a multi-aperture interferometer to detect the presence of a target material in an exemplary embodiment of the invention. As seen in step 301 of FIG. 3, the optical path lengths of the apertures are set in accordance with a predetermined value of optical path length difference. In this regard, the predetermined optical path length difference can be achieved by moving only one of the apertures to a selected optical path length and leaving the other apertures fixed, or by moving all apertures to corresponding independent optical path lengths.

In an exemplary embodiment, as explained above with respect to FIG. 2, the apertures are grouped into a first aperture group and a second aperture group, where the first aperture group is set at a first optical path length, and the second aperture group is set at a second optical path length different than the first optical path length, thereby achieving the predetermined optical path length difference.

As mentioned above, the present invention takes advantage of the fact that spectral data of different wavelengths from a point source can be spatially separated using an interferometer-type optical system. Accordingly, a laser having a first wavelength can be used to illuminate a target material having a second wavelength, which is different than the first wavelength. The wavefront from the point source is then collected by an interferometer-type optical system and the resulting interference pattern contains spectral data that is spatially distributed based on wavelength, thereby allowing a quick determination of the presence of the target material based on the presence of spectral data corresponding to the target material wavelength which is spaced apart from other spectral data corresponding to the laser wavelength. In this regard, the predetermined optical path length difference is determined so that spectral data corresponding to the source laser wavelength in the spectral data set is in phase, and so that spectral data corresponding to the target material wavelength in the spectral data set is out of phase, thereby resulting in spatial separation in the spectral data set of spectral data corresponding to the two different wavelengths.

In an exemplary embodiment, the determined optical path length difference is chosen so that the optical path length of the aperture(s) used to collect the in-phase source laser wavelength is an integer multiple of the source laser wavelength, and the optical path length of the aperture(s) used to collect the out-of-phase target material wavelength is not an integer multiple of the target material wavelength. For example, in a case where it is desired for the target material wavelength to be out-of-phase by one-half of the target material wavelength, the optical path length difference is determined as follows:

$$OPD = n*\lambda_l = (m + 1/2)*\lambda_m$$

Where OPD is the optical path length difference, $\lambda_l$ is the source laser wavelength, $\lambda_m$ is the target material wavelength, n is an integer representing a number of source laser wavelengths, and m is an integer representing a number of target material wavelengths. Of course, it should be appreciated that the present invention also encompasses any fractional number for the out-of-phase target material wavelength other than ½, such as ⅓, ¼, ⅝, etc.

Returning to FIG. 3, once the apertures are set in accordance with the predetermined optical path length difference, the scene of interest is illuminated with the source laser in step 302. In an exemplary embodiment, the multi-aperture interferometer system is a spaced-based array of telescopes, and the source laser may be a ground-based laser, or airborne laser on an airplane or other vehicle, including the space platform on which the array of telescopes is disposed. Next, in step 303, the wavefront for the scene is collected by the apertures and then interfered with each other at the image plane of the multi-aperture interferometer system to form an interference pattern. A digital radiation intensity sensor located at the image plane captures the spectral data set associated with the interference pattern. The spectral data set contains spectral data that is spatially distributed as a result of the optical path length difference between the apertures of the multi-aperture interferometer system.

In step 304, the captured spectral data set is used to determine the presence of the target material at the point source in the scene, and the process then ends. It should be appreciated that there may be many point sources in the scene as they are illuminated with the source laser, and that spectral data from each point source will appear in the interference pattern for the scene. The determination of whether the target material is present is made possible due to the fact that the source laser wavelength in the spectral data set is in-phase and the target material wavelength in the spectral data set is out-of-phase, thereby resulting in spatial separation of the spectral data corresponding to the two different wavelengths. In general, the in-phase spectral data is spatially located at a center spot (or center lobe) at the point source. The out-of-phase spectral data is spatially located at one or more side lobes located adjacent to the center spot. In this manner, a spectral image of the spectral data set may be visually inspected and, if spectral data is seen in one or more side lobes corresponding to the wavelength of the target material, then this is an indication that the target material is present at the point source in the scene.

In another exemplary embodiment, the presence of the target material in side lobes of the spectral data set can be performed automatically be a comparison of the light intensity level of each pixel of data in the side lobe regions and determining is the light intensity level of that pixel is greater than a predetermined intensity threshold. If there is a sufficient number of pixels in the in the side lobe regions with an intensity level greater than the predetermined intensity threshold, then the target material is indicated as being present at the point source in the scene.

Figure 4:
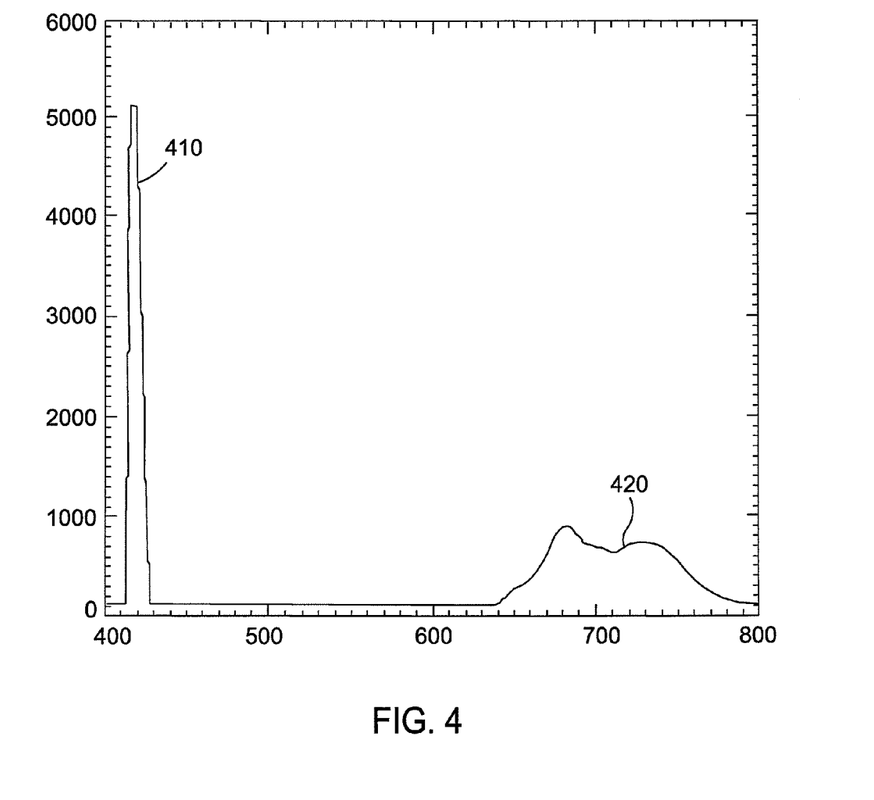
FIG. 4 is a graph illustrating the wavelength content of a source laser and of a target material according to one embodiment of the invention.

As mentioned above, the source laser wavelength is selected to be different than the target material wavelength, so that spectral data for each can be spatially distributed according to the invention. FIG. 4 is a graph that depicts the wavelength content of a source laser and of a target material according to an exemplary embodiment. As seen in FIG. 4, the wavelength spike 410 is the wavelength content of the source laser and the wavelength distribution 420 is the wavelength content of the target material. In this example, the source laser is a pump laser and its wavelength distribution is centered at approximately 420 nm, which is in the blue wavelength region of the visible spectra. The target material wavelength distribution is a broad band at approximately 680 to 720 nm, and corresponds to chlorophyll which absorbs radiation strongly in the blue wavelength region of the visible spectra. In this example, the source laser with a wavelength of 420 nm will be absorbed by the target material, chlorophyll, which fluoresces in a broad band between 680 nm and 720 nm, which is in the red wavelength region of the visible spectra.

Accordingly, as explained above, the optical path lengths of the multiple apertures are adjusted so that the system is phased for the 420 nm wavelength laser and is ½ wave out of phase for the center of the chlorophyll fluorescence wavelength band at 700 nm. The red light from the fluorescence of the chlorophyll (target material) is spatially distributed into the side lobes of the point spread function of the spectral data set, thereby separating the two wavelengths spatially on the focal plane. Accordingly, if there is chlorophyll present, then the spectral data at the side lobes will peak up with the 685 nm (red) radiation, and if no chlorophyll is present, then just the well-focused center spot (lobe) with the 430 nm (blue) radiation will appear.

Figure 5A:
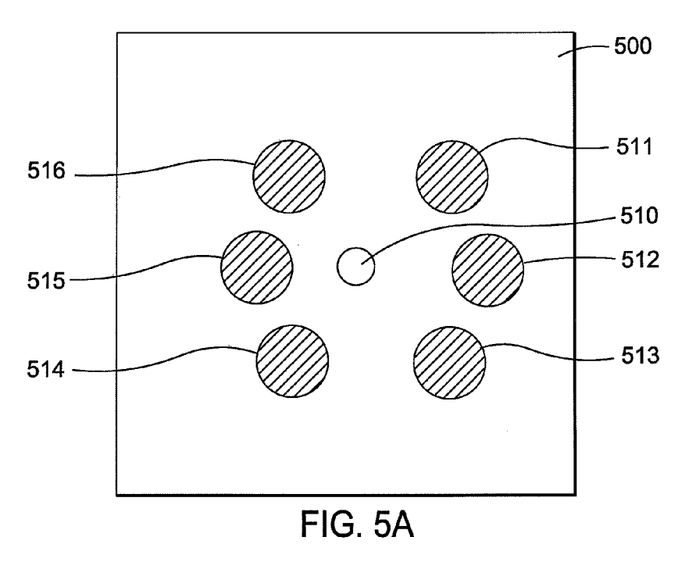
FIG. 5A is a diagram illustrating a spatially-distributed spectral data set according to one embodiment of the invention.
Figure 5B:
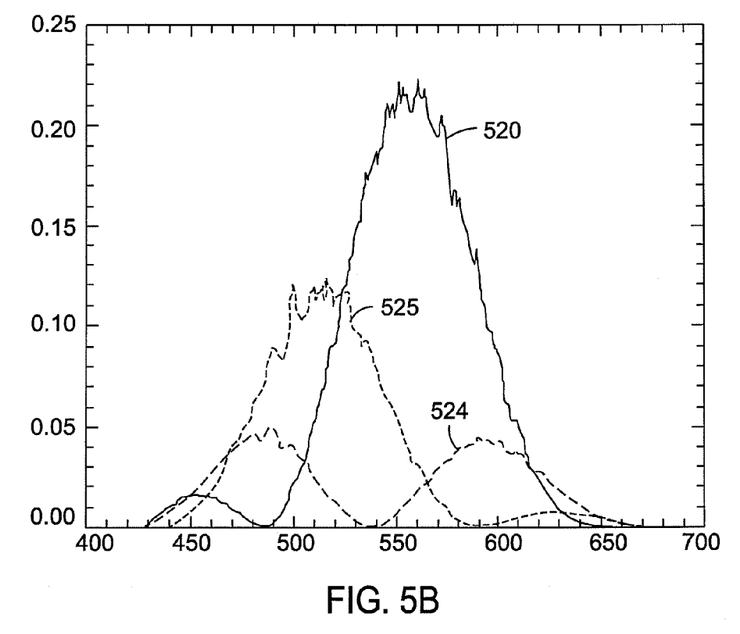
FIG. 5B is a graph illustrating the wavelength content of the spatially-distributed spectral data set shown in FIG. 5A.

FIGS. 5A and 5B depict an exemplary embodiment of a spatially-distributed spectral data set of an interference pattern of a point source (point spread function) and the corresponding wavelength content of the spatially-distributed spectral data, corresponding to a 1.7 micron optical path length difference. In FIG. 5A, the interference pattern (point spread function) is shown in which center spot (lobe) 510 is the in-phase wavelength spectra, and side lobes 511 to 516 are the out-of-phase spectra, which are spatially distributed with respect to center spot 510. The spectra of side lobes 511 to 516 are comprised of different out-of-phase wavelengths. In FIG. 5B, the wavelength content is represented for the spatially-distributed spectral data shown in FIG. 5A. As seen in FIG. 5B, curve 520 is the wavelength band corresponding to in-phase center spot 510, which is seen to have a peak wavelength of approximately 560 nm. Curve 524 is the wavelength band corresponding to side lobes 512, 514 and 516, which is seen to have peak wavelengths at approximately 485 and 590 nm. Lastly, curve 525 is the wavelength band corresponding to side lobes 511, 513 and 515, which is seen to have a peak wavelength at approximately 510 nm. In this manner, the spectra content of the side lobes can be examined to determine whether a particular material is present in the scene that corresponds to the wavelength band of the side lobe.

Figure 6A:
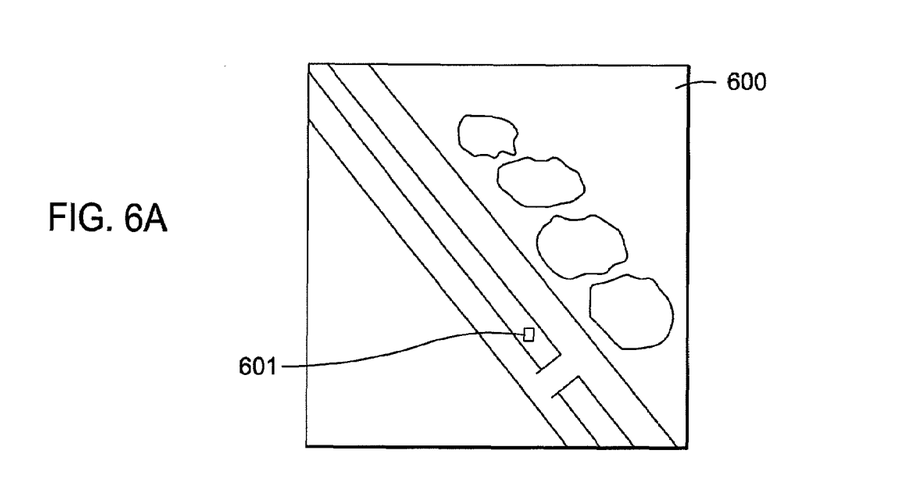
FIG. 6A is a diagram illustrating a scene containing a point source according to one embodiment of the invention.
Figure 6B:
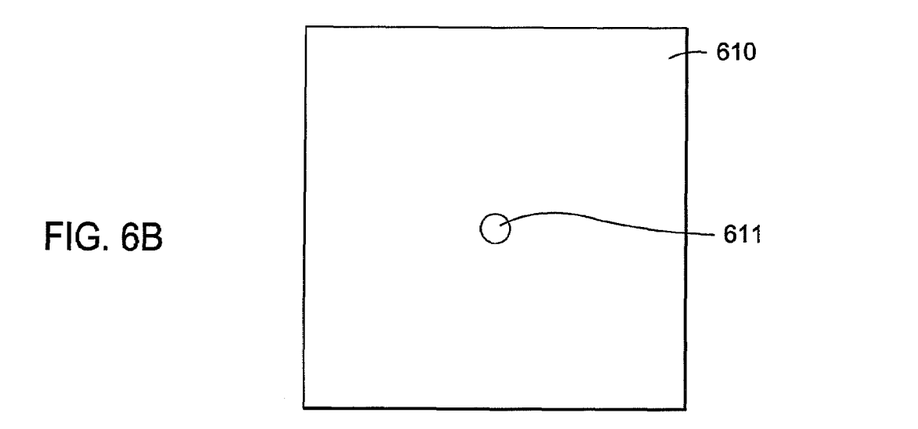
FIG. 6B is a diagram illustrating a spatially-distributed spectral data set for an in-phase point source according to one embodiment of the invention.
Figure 6C:
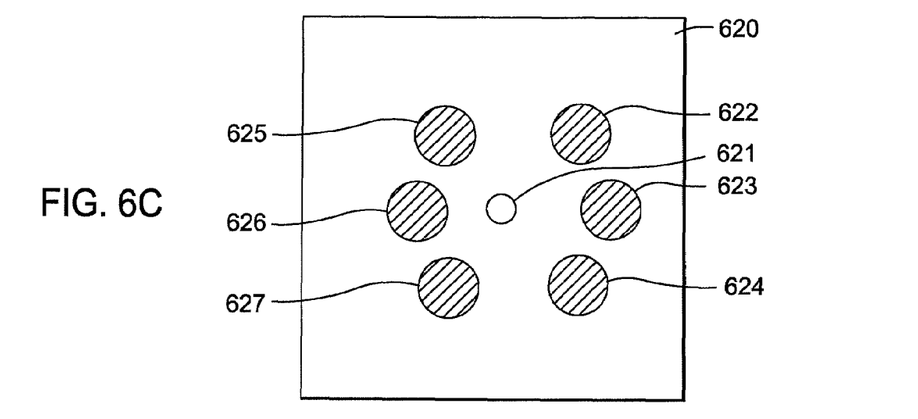
FIG. 6C is a diagram illustrating a spatially-distributed spectral data set for in-phase spectral data from a point source and out-of-phase spectral data from a target material according to one embodiment of the invention.

In the examples depicted in FIGS. 6A, 6B and 6C, the optical path length difference of the multi-aperture system is set so that only the source laser wavelength is in-phase, and the target material wavelength is out-of-phase. FIG. 6A is a depiction of an exemplary scene for analysis according to the invention. Scene 600 is shown in FIG. 6A, and is comprised of landscape features and objects comprised of different materials, and includes point source 601, which is illuminated by a source laser having a source laser wavelength. FIG. 6B shows the spatially-distributed spectral data set for the point spread function of point source 601 in an example in which no target material is present at point source 601, and so only the in-phase spectral data corresponding to the source laser is shown in center spot 611 of the spectral data. FIG. 6C shows the spatially-distributed spectral data set for the point spread function of point source 601 in an example in which the target material is present at point source 601, and so the in-phase spectral data corresponding to the source laser is shown in center spot 621 of the spectral data, and the out-of-phase spectral data corresponding to the target material is shown in side lobes 622 to 625 of the spectral data. In view of the above, it is easy to determine whether the target material is present by a visual inspection of the side lobe regions of the point spread function spectral data.

Figure 7:
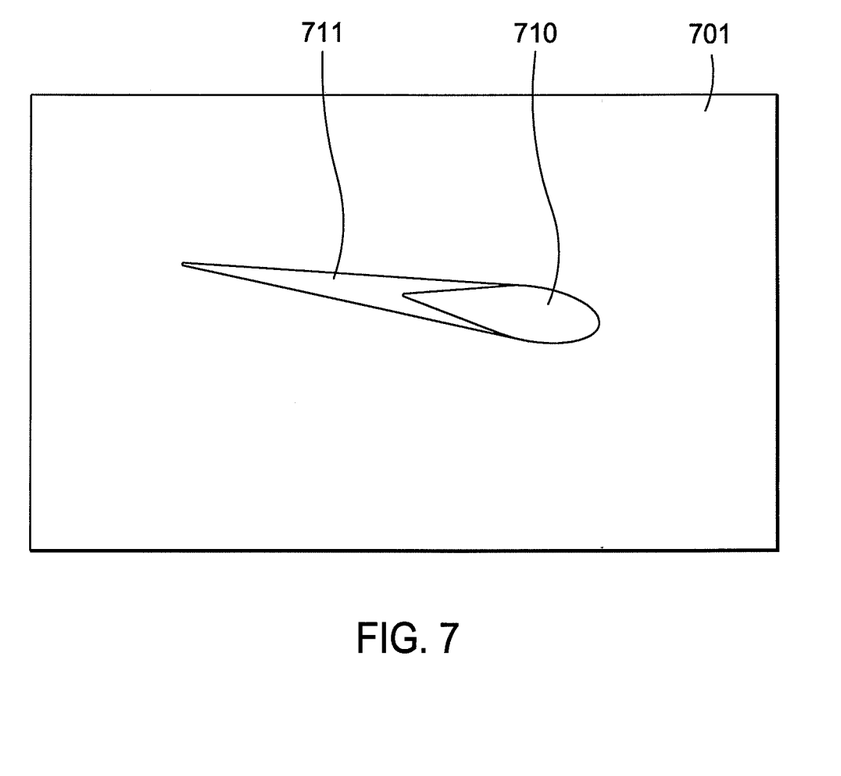
FIG. 7 is a diagram illustrating a spatially-distributed spectral data set for a laser illuminated quantum dot according to one embodiment of the invention.

FIG. 7 is an exemplary depiction of a spatially-distributed spectral data set for a laser illuminated quantum dot according to an embodiment of the invention. Quantum dots fluoresce when illuminated with a laser of an appropriate wavelength. In the example shown in FIG. 7, the spectral data set 701 is shown in which spectral data 710 and 711 is shown which corresponds to a particular type of quantum dot which fluoresces when pumped with a 488 nm source laser. The optical path length difference of the multi-aperture system in this example is adjusted so that the 488 nm source laser is in-phase. The quantum dot has a large fluorescence cross-section and is therefore easy to identify in the spectral data. The spectral data 710 and 711 represent two different levels of intensity of fluorescence from the quantum dot, with the intensity of spectral data 710 being higher than that of spectral data 711. In this manner, the presence of quantum dots in a scene can easily be determined.

Figure 8:
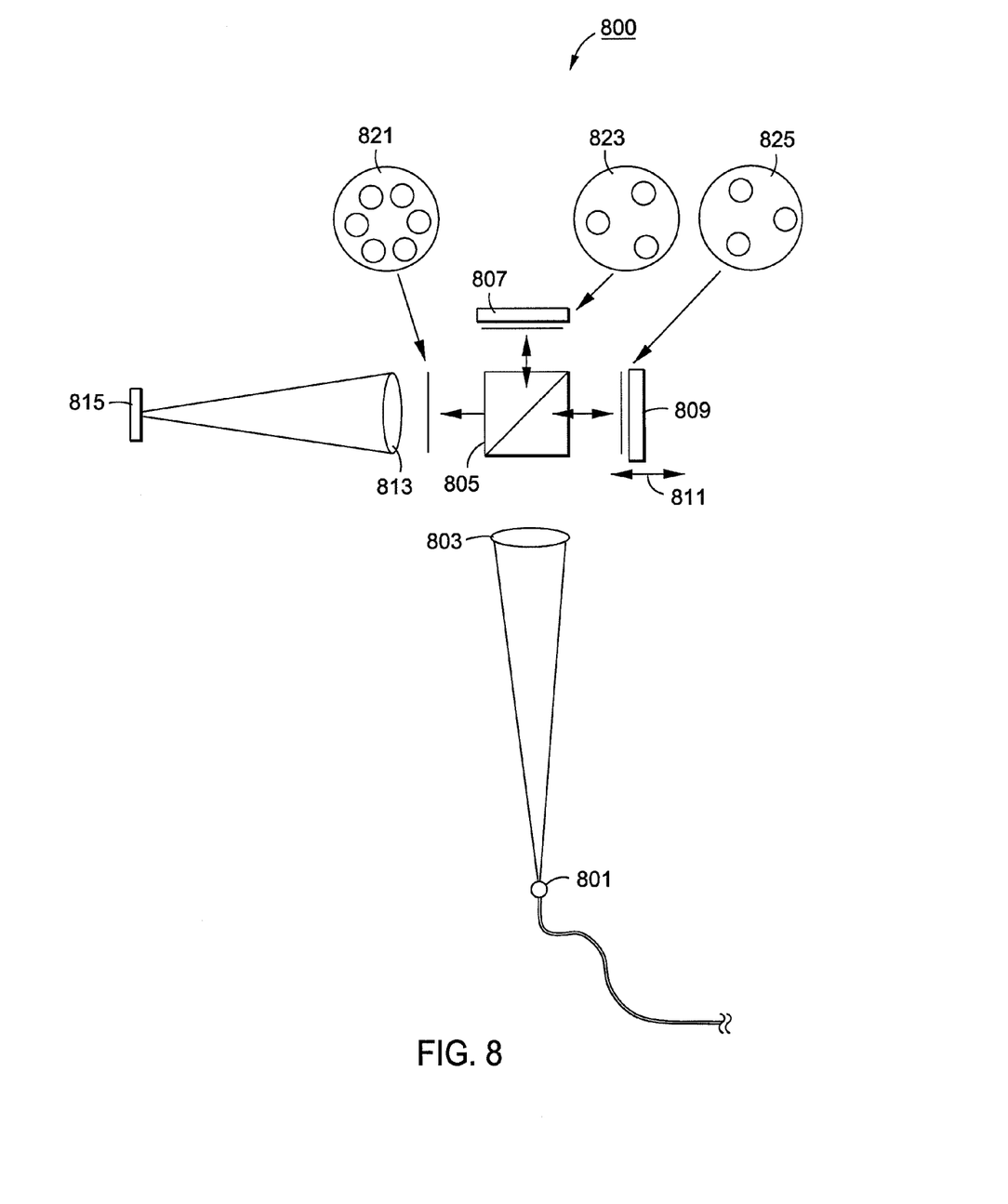
FIG. 8 is a diagram illustrating a simulated multi-aperture interferometer according to one embodiment of the invention.

FIG. 8 depicts a system for simulating a multi-aperture system by using a Michelson interferometer with masks that represent the multiple apertures, according to another embodiment of the invention. As seen in FIG. 8, the system includes Michelson interferometer 800 that has two masks 823 and 825 that each have three apertures cut into the mask. The mask apertures 823 and 825 are in different locations in each leg so that they result in a simulated combination of a six aperture telescope array. As seen in FIG. 8, Michelson interferometer 800 includes point source 801, split mirror 805, lenses 803 and 805, and mirrors 807 and 809, each of which corresponds to a different leg having a different optical path length. The optical path length of one leg 811 of Michelson interferometer 800 can be varied so that three of the simulated apertures represented by mask 825 vary in optical path length (piston) simultaneously.

The interference of the wavefront portions from the two different path lengths to form a six aperture combination occurs at image plane 815. According to one test setup, the Michelson mask 821 is introduced before the image plane as a truth sensor for the system and is permanently positioned while the other three-aperture masks 823 and 825 are moved in an out of the beam paths. In this manner, the above invention can be practiced in a small environment or with different hardware, to generate a spatially distributed spectral data set from a point source to determine the presence of a target material, by adjusting the optical path length difference of the system so that the source wavelength is in-phase, and the target material wavelength is out-of-phase.

Figure 9:
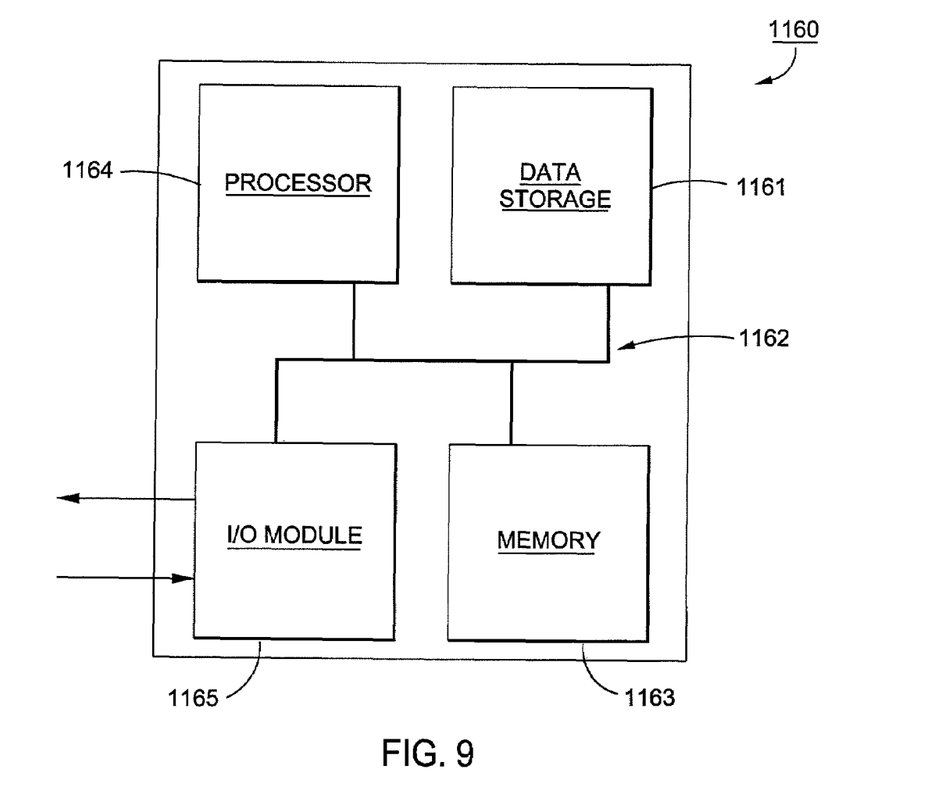
FIG. 9 is a block diagram illustrating a computing device with which the invention may be practiced according to one embodiment of the invention.

FIG. 9 is a block diagram depicting a computer system with which the present invention may be implemented according to one embodiment of the present invention. As seen in FIG. 9, computer system 1160 is provided, with which the present invention may be implemented, according to one embodiment. Computer system 1160 includes a bus 1162 or other communication mechanism for communicating information between components of computer system 1160, and a processor 1164, coupled with bus 1162, for processing information and instructions. Computer system 1160 also includes a memory 1163, such as a random access memory ("RAM") or other dynamic storage device, coupled to bus 1162 for storing information and instructions to be executed by processor 1164. Memory 1163 may also be used for storing temporary variable or other intermediate information during execution of instructions to be executed by processor 1164. Computer system 1160 further includes data storage device 1161, such as a magnetic disk or optical disk, coupled to bus 1162 for storing information and computer executable steps and/or instructions.

Computer system 1160 may be coupled via I/O module 1165 to a display device (not illustrated), such as a cathode ray tube ("CRT") or liquid crystal display ("LCD") for displaying information to a computer user. In addition, an input device, such as, for example, a keyboard and a mouse may be coupled to computer system 1160 via I/O module 1165 for communicating information and command selections to processor 1164.

According to one embodiment, the invention is implemented by computer system 1160 in response to processor 1164 executing one or more sequences of one or more computer-executable steps and instructions contained in memory 1163. Such instructions may be read into memory 1163 from another computer-readable medium, such as data storage device 1161. Execution of the sequences of instructions contained in main memory 1163 causes processor 1164 to perform the process steps described herein. Of course, processor 1164 can be comprised of multiple processors in a multi-processing arrangement to execute the sequences of instructions contained in memory 1163. In alternative embodiments, hard-wired circuitry may be used in place of, or in combination with, software instructions to implement the invention. Thus, embodiments of the invention are not limited to any specific combination of hardware circuitry and software The term "computer-readable medium" as used herein refers to any medium that participates in providing instructions and information to processor 1164 for execution. Such a medium may take many forms, including, but not limited to, non-volatile media, volatile media, and transmission media. Non-volatile media include, for example, optical or magnetic disks, such as data storage device 1161. Volatile media include dynamic memory, such as memory 1163. Transmission media include coaxial cables, copper wire, and fiber optics, including the wires that comprise bus 1162. Transmission media can also take the form of acoustic or light waves, such as those generated during radio frequency and infrared data communications. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

While the present invention has been particularly described above with reference to the various figures and embodiments, it should be understood that the invention is not limited to the above-described embodiments. Various changes and modifications may be made to the invention by those of ordinary skill in the art without departing from the spirit and scope of the invention.

What is claimed is:

1. A method for detecting the presence of a target material in a scene by using a multi-aperture interferometer system having a plurality of apertures at least one of which has an adjustable optical path length, the method including:
    adjusting the at least one aperture having the adjustable optical path length to obtain a predetermined optical path length difference among the plurality of apertures, the predetermined optical path length difference being based on a source laser wavelength of a source laser and a target material wavelength of a target material;
    illuminating the scene with the source laser;
    capturing a spectral data set corresponding to an interference pattern generated in the multi-aperture interferometer system for an illuminated point source in the scene, the spectral data set containing spatially distributed spectral data; and
    determining whether the target material is present at the illuminated point source based on a presence of spectral data in at least one side lobe of the spectral data set.

2. The method according to claim 1, wherein the multi-aperture interferometer is a multi-telescope array and the plurality of apertures are comprised of a plurality of telescope apertures.

3. The method according to claim 2, wherein each one of the plurality of telescope apertures has an adjustable optical path length, and the plurality of telescope apertures are arranged into a first aperture group in which each telescope aperture is adjusted to a first optical path length, and a second aperture group in which each telescope aperture is adjusted to a second optical path length that is different than the first optical path length in accordance with the predetermined optical path length difference.

4. The method according to claim 1, wherein the predetermined optical path length difference is determined so that spectral data corresponding to the source laser wavelength in the spectral data set is in phase, and so that spectral data corresponding to the target material wavelength in the spectral data set is out of phase.

5. The method according to claim 1, wherein the predetermined optical path length difference is determined according to:

$$OPD = n*\lambda_l = (m + \frac{1}{2})*\lambda_m$$

where $\lambda_l$ is the source laser wavelength, $\lambda_m$ is the target material wavelength, n is an integer representing a number of source laser wavelengths, and m is an integer representing a number of target material wavelengths.

6. The method according to claim 1, wherein the spectral data set includes a center lobe and a plurality of side lobes, and wherein the spectral data corresponding to the source laser wavelength is disposed in the center lobe and the spectral data corresponding to the target material wavelength is disposed in at least one of the side lobes.

7. The method according to claim 1, wherein, in the capturing step, the spectral data set is captured with a digital radiation intensity sensor disposed at an image plane of the multi-aperture interferometer system.

8. The method according to claim 1, wherein, in the determining step, the presence of spectral data in the at least one side lobe is based on an intensity level of the spectral data in the at least one side lobe being greater than a predetermined intensity threshold.

9. Computer-executable process steps for detecting the presence of a target material in a scene by using a multi-aperture interferometer system having a plurality of apertures at least one of which has an adjustable optical path length, the computer-executable process steps including:
    adjusting the at least one aperture having the adjustable optical path length to obtain a predetermined optical path length difference among the plurality of apertures, the predetermined optical path length difference being based on a source laser wavelength of a source laser and a target material wavelength of a target material;
    illuminating the scene with the source laser;
    capturing a spectral data set corresponding to an interference pattern generated in the multi-aperture interferometer system for an illuminated point source in the scene, the spectral data set containing spatially distributed spectral data; and
    determining whether the target material is present at the illuminated point source based on a presence of spectral data in at least one side lobe of the spectral data set.

10. The computer-executable process steps according to claim 9, wherein the multi-aperture interferometer is a multi-telescope array and the plurality of apertures are comprised of a plurality of telescope apertures.

11. The computer-executable process steps according to claim 10, wherein each one of the plurality of telescope apertures has an adjustable optical path length, and the plurality of telescope apertures are arranged into a first aperture group in which each telescope aperture is adjusted to a first optical path length, and a second aperture group in which each telescope aperture is adjusted to a second optical path length that is different than the first optical path length in accordance with the predetermined optical path length difference.

12. The computer-executable process steps according to claim 9, wherein the predetermined optical path length difference is determined so that spectral data corresponding to the source laser wavelength in the spectral data set is in phase, and so that spectral data corresponding to the target material wavelength in the spectral data set is out of phase.

13. The computer-executable process steps according to claim 9, wherein the predetermined optical path length difference is determined according to:

$$OPD = n*\lambda_l = (m+\tfrac{1}{2})*\lambda_m$$

where $\lambda_l$ is the source laser wavelength, $\lambda_m$ is the target material wavelength, n is an integer representing a number of source laser wavelengths, and m is an integer representing a number of target material wavelengths.

14. The computer-executable process steps according to claim 9, wherein the spectral data set includes a center lobe and a plurality of side lobes, and wherein the spectral data corresponding to the source laser wavelength is disposed in the center lobe and the spectral data corresponding to the target material wavelength is disposed in at least one of the side lobes.

15. The computer-executable process steps according to claim 9, wherein, in the capturing step, the spectral data set is captured with a digital radiation intensity sensor disposed at an image plane of the multi-aperture interferometer system.

16. The computer-executable process steps according to claim 9, wherein, in the determining step, the presence of spectral data in the at least one side lobe is based on an intensity level of the spectral data in the at least one side lobe being greater than a predetermined intensity threshold.

17. A multi-aperture imaging system for detecting the presence of a target material in a scene, comprising:

a plurality of apertures at least one of which has an adjustable optical path length, each aperture collecting a wavefront portion;

combiner optics for combining and interfering on an image plane the collected wavefront portions to create a spatially-distributed interference pattern which is captured by at least one digital radiation intensity sensor to generate a spatially-distributed spectral data set;

one or more processors; and a computer readable medium carrying one or more sequences of instructions for detecting the presence of a target material in a scene, wherein execution of the one or more sequences of instructions by the one or more processors causes the one or more processors to perform the steps of:

adjusting the at least one aperture having the adjustable optical path length to obtain a predetermined optical path length difference among the plurality of apertures, the predetermined optical path length difference being based on a source laser wavelength of a source laser and a target material wavelength of the target material;

illuminating the scene with the source laser;

capturing a spectral data set corresponding to the interference pattern generated in the multi-aperture interferometer system for an illuminated point source in the scene, the spectral data set containing spatially distributed spectral data; and determining whether the target material is present at the illuminated point source based on a presence of spectral data in at least one side lobe of the spectral data set.

18. The multi-aperture imaging system according to claim 17, wherein the multi-aperture interferometer is a multi-telescope array and the plurality of apertures are comprised of a plurality of telescope apertures.

19. The multi-aperture imaging system according to claim 18, wherein each one of the plurality of telescope apertures has an adjustable optical path length, and the plurality of telescope apertures are arranged into a first aperture group in which each telescope aperture is adjusted to a first optical path length, and a second aperture group in which each telescope aperture is adjusted to a second optical path length that is different than the first optical path length in accordance with the predetermined optical path length difference.

20. The multi-aperture imaging system according to claim 17, wherein the predetermined optical path length difference is determined so that spectral data corresponding to the source laser wavelength in the spectral data set is in phase, and so that spectral data corresponding to the target material wavelength in the spectral data set is out of phase.

21. The multi-aperture imaging system according to claim 17, wherein the predetermined optical path length difference is determined according to:

$$OPD = n*\lambda_l = (m+\tfrac{1}{2})*\lambda_m$$

where $\lambda_l$ is the source laser wavelength, $\lambda_m$ is the target material wavelength, n is an integer representing a number of source laser wavelengths, and m is an integer representing a number of target material wavelengths.

22. The multi-aperture imaging system according to claim 17, wherein the spectral data set includes a center lobe and a plurality of side lobes, and wherein the spectral data corresponding to the source laser wavelength is disposed in the center lobe and the spectral data corresponding to the target material wavelength is disposed in at least one of the side lobes.

23. The multi-aperture imaging system according to claim 17, wherein, in the capturing step, the spectral data set is captured with a digital radiation intensity sensor disposed at an image plane of the multi-aperture interferometer system.

24. The multi-aperture imaging system according to claim 17, wherein, in the determining step, the presence of spectral data in the at least one side lobe is based on an intensity level of the spectral data in the at least one side lobe being greater than a predetermined intensity threshold.

* * * * *